(12) United States Patent
Ndukaife

(10) Patent No.: US 11,823,807 B2
(45) Date of Patent: Nov. 21, 2023

(54) TRAPPING AND MANIPULATION OF NANOPARTICLES WITH LIGHT AND ELECTRIC FIELD

(71) Applicant: Vanderbilt University, Nashville, TN (US)

(72) Inventor: Justus C. Ndukaife, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 59 days.

(21) Appl. No.: 17/443,682

(22) Filed: Jul. 27, 2021

(65) Prior Publication Data

US 2022/0028572 A1     Jan. 27, 2022

Related U.S. Application Data

(60) Provisional application No. 63/056,922, filed on Jul. 27, 2020.

(51) Int. Cl.
    *G21K 1/00*      (2006.01)

(52) U.S. Cl.
    CPC .................... *G21K 1/006* (2013.01)

(58) Field of Classification Search
    CPC ...................................................... G21K 1/006
    See application file for complete search history.

(56) References Cited

U.S. PATENT DOCUMENTS

| | | | | |
|---|---|---|---|---|
| 9,443,632 | B2* | 9/2016 | Wereley | G21K 1/006 |
| 10,180,383 | B2* | 1/2019 | Ndukaife | G02B 5/008 |
| 10,508,981 | B2* | 12/2019 | Ndukaife | G21K 1/006 |
| 10,876,946 | B2* | 12/2020 | Ndukaife | G21K 1/006 |
| 11,367,539 | B2* | 6/2022 | Zheng | G21K 1/006 |
| 2017/0284935 | A1* | 10/2017 | Ndukaife | G02B 5/008 |
| 2019/0154558 | A1* | 5/2019 | Ndukaife | G21K 1/006 |

OTHER PUBLICATIONS

Ashkin et al., "Observation of a single-beam gradient force optical trap for dielectric particles", Optics Letters, vol. 11, No. 5, 1986, 3 pages.
Ashkin et al., "Optical trapping and manipulation of viruses and bacteria", Science, vol. 235, 1987, pp. 1517-1520.

(Continued)

*Primary Examiner* — David A Vanore
(74) *Attorney, Agent, or Firm* — Michael Best & Friedrich LLP

(57) ABSTRACT

A nanotweezer and method of trapping and dynamic manipulation thereby are provided. The nanotweezer comprises a first metastructure including a first substrate, a first electrode, and a plurality of plasmonic nanostructures arranged in an array, and a trapping region laterally displaced from the array; a second metastructure including a second substrate and a second electrode; a microfluidic channel between the first metastructure and the second metastructure; a voltage source configured to selectively apply an electric field between the first electrode and the second electrode; and a light source configured to selectively apply an excitation light to the microfluidic channel at a first location corresponding to the array, thereby to trap a nanoparticle at a second location corresponding to the trapping region.

16 Claims, 6 Drawing Sheets

(56) References Cited

OTHER PUBLICATIONS

Baffou et al., "Mapping Heat Origin in Plasmonic Structures", Physical Review Letters, vol. 104, 2010, pp. 136805-1-4.
Berthelot et al., "Three-dimensional manipulation with scanning near-field optical nanotweezers", Nature Nanotechnology, 2014, vol. 9, pp. 295-299.
Blázquez-Castro, "Optical tweezers: Phototoxicity and thermal stress in cells and biomolecules," Micromachines, vol. 10, 2019, pp. 1-42.
Garcia-Guirado et al., "Overcoming Diffusion-Limited Biosensing by Electrothermoplasmonics," ACS Photonics, vol. 5, No. 9, 2018, pp. 3673-3679.
Ghosh et al., "All optical dynamic nanomanipulation with active colloidal tweezers," Nat. Commun., vol. 10, No. 1, 2019, pp. 4191.
Hatlo et al., "The role of image charges in the interactions between colloidal particles," Soft Matter, vol. 4, No. 8, 2008, pp. 1582-1596.
Hong et al., "Optofluidic control using plasmonic TiN bowtie nanoantenna," Opt. Mater. Express, vol. 9, No. 3, 2019, 12 pages.
Juan et al., "Self-induced back-action optical trapping of dielectric nanoparticles," Nat. Phys., vol. 5, No. 12, 2009, pp. 915-919.
Krishnan et al., "Geometry-induced electrostatic trapping of nanometric objects in a fluid," Nature, vol. 467, No. 7, 2010, pp. 692-695.
Lin et al., "Opto-thermoelectric nanotweezers," Nat. Photonics, vol. 12, No. 4, 2018, pp. 195-201.
Mandal et al., "Nanomanipulation using silicon photonic crystal resonators," Nano Lett., vol. 10, No. 1, 2010, pp. 99-104.
Melcher et al., "Traveling-wave bulk electroconvection induced across a temperature gradient," Phys. Fluids, vol. 10, No. 6, 1967, pp. 1178-1185.
Nagpal et al., "Ultrasmooth patterned metals for plasmonics and metamaterials," Science., vol. 325, No. 5940, 2009, pp. 594-597.
Ndukaife et al., "High-Resolution Large-Ensemble Nanoparticle Trapping with Multifunctional Thermoplasmonic Nanohole Metasurface," ACS Nano, vol. 12, No. 6, 2018, pp. 5376-5384.
Ndukaife et al., "Long-range and rapid transport of individual nano-objects by a hybrid electrothermoplasmonic hanotweezer," Nat. Nanotechnol., vol. 11, No. 1, 2016, pp. 53-59.
Ndukaife et al., "Plasmonics—turning loss into gain", Science, vol. 351, No. 6271, 2016, pp. 334-335.
Neuman et al., "Optical trapping", Rev. Sci. Instrum., vol. 75, No. 9, 2004, pp. 2787-2809.
Pang et al., "Optical Trapping of 12 nm Dielectric Spheres Using Double-Nanoholes in a Gold Film," Nano Lett., vol. 11, 2011, pp. 3763-3767.
Pang et al., "Optical trapping of a single protein," Nano Lett., vol. 12, No. 1, 2012, pp. 402-406.
Roxworthy et al., "Application of Plasmonic Bowtie Nanoantenna Arrays for Optical Trapping, Stacking, and Sorting," Nano Lett., vol. 12, No. 2, 2012, pp. 796-801.
Saleh et al., "Toward efficient optical trapping of Sub-10-nm particles with coaxial plasmonic apertures," Nano Lett., 2012, vol. 12, pp. 5581-5586.
Scheibner et al., "Superradiance of quantum dots", Nature Physics, vol. 3, No. 2, 2007, pp. 106-110.
Shoji et al., "Plasmonic Optical Tweezers toward Molecular Manipulation: Tailoring Plasmonic Nanostructure, Light Source, and Resonant Trapping," J. Phys. Chem. Lett., vol. 5, No. 17, 2014, pp. 2957-2967.
Squires et al., "Induced-charge electro-osmosis," J. Fluid Mech., vol. 509, 2004, pp. 217-252.
Tsubio, "Plasmonic optical tweezers: A long arm and a tight grip", Nature Nanotechnology, vol. 11, 2016, pp. 5-6.
Wang et al., "Trapping and rotating nanoparticles using a plasmonic nano-tweezer with an integrated heat sink," Nat. Commun., vol. 2, No. 1, 2011, 6 pages.
Werner et al., "Microfluidic array cytometer based on refractive optical tweezers for parallel trapping, imaging, and sorting of individual cells", Lab on a Chip, 2011, vol. 11, pp. 2432-2439.
Yanik et al., "An Optofluidic Nanoplasmonic Biosensor for Direct Detection of Live Viruses from Biological Media", Nano Letters, vol. 10, No. 12, 2010, pp. 4962-4969.
Yoo et al.,, "Low-Power Optical Trapping of Nanoparticles and Proteins with Resonant Coaxial Nanoaperture Using 10 hm Gap," Nano Lett., 2018, pp. 3637-3642.
Zheng et al., "Nano-Optical Conveyor Belt, Part II: Demonstration of Handoff Between Near-Field Optical Traps," Nano Lett., vol. 14, No. 6, 2014, pp. 2971-2976.

* cited by examiner

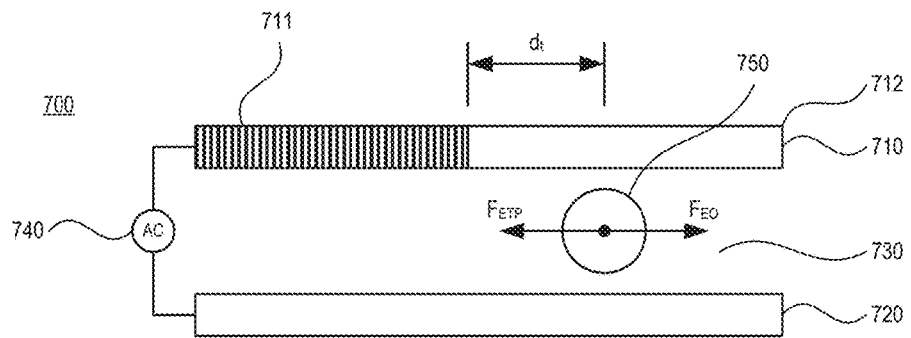
FIG. 7
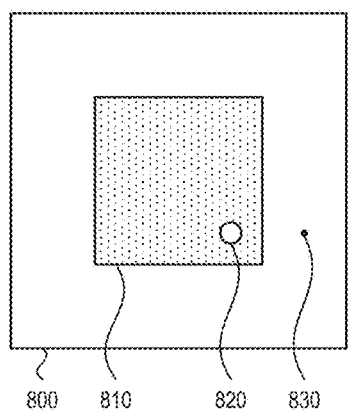 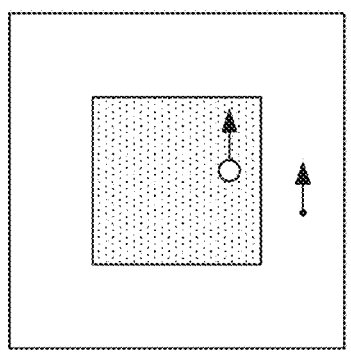 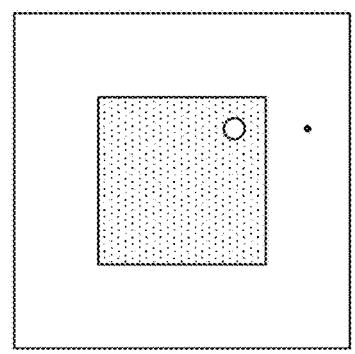
FIG. 8A  FIG. 8B  FIG. 8C

TRAPPING AND MANIPULATION OF NANOPARTICLES WITH LIGHT AND ELECTRIC FIELD

RELATED APPLICATIONS

This application claims the benefit of U.S. Provisional Patent Application No. 63/056,922, entitled "TRAPPING AND MANIPULATION OF NANOPARTICLES WITH LIGHT AND ELECTRIC FIELD," filed Jul. 27, 2020, the entire contents of which are incorporated herein by reference.

STATEMENT REGARDING FEDERALLY SPONSORED RESEARCH & DEVELOPMENT

This invention was made with government support under Award Number 1933109 award by the National Science Foundation. The government has certain rights in the invention.

BACKGROUND

1. Field of the Disclosure

This application relates generally to the optical manipulation of nanoscale objects. More specifically, this application relates to an optically controlled nanotweezer, and to the trapping and dynamic manipulation of nano-objects thereby.

2. Description of Related Art

Optical tweezers have been studied as a tool for the non-invasive trapping and manipulation of colloidal particles and biological cells. However, the diffraction limit presents difficulties for the low-power trapping of nanometer-scale objects. In some comparative approaches, significantly increasing the laser power may provide enough trapping potential well depth to trap nanoscale objects. For example, some comparative approaches implement electro-thermoplasmonic (ETP) trapping, in which an ETP flow is induced to initiate rapid particle transport towards a plasmonic hotspot for trapping at the hotspot. However, because such approaches result in trapping at or near the laser focus, the optical intensity required for trapping causes phototoxicity and thermal stress where the nanoscale objects are biological specimens.

Accordingly, there exists a need for a nanotweezer capable of trapping and dynamically manipulating nanometer-scale objects, including biological specimens, at locations that are on the order of microns away from the high-intensity laser focus.

SUMMARY

Various aspects of the present disclosure relate to devices, systems, and methods for the trapping and dynamic manipulation of individual nano-objects by an optically-controlled nanotweezer.

In one implementation, this disclosure provides a nanotweezer comprising a first meta structure, a second metastructure, a microfluidic channel, a voltage sources, and a light source. The first metastructure includes a first substrate, a first electrode, a plurality of plasmonic nanostructures arranged in an array, and a trapping region laterally displaced from the array. The second metastructure includes a second substrate and a second electrode. The microfluidic channel is positioned between the first metastructure and the second metastructure. The voltage source is configured to selectively apply an electric field between the first electrode and the second electrode. The light source is configured to selectively apply an excitation light to the microfluidic channel at a first location corresponding to the array, wherein the application of the excitation light is configured to trap a nanoparticle at a second location corresponding to the trapping region.

In another exemplary aspect of the present disclosure, there is provided a method of operating a nanotweezer that includes a first metastructure, a second metastructure, and a microfluidic channel positioned between the first metastructure and the second metastructure. The first metastructure includes a first substrate, a first electrode, a plurality of plasmonic nanostructures arranged in an array, and a trapping region laterally displaced from the array. The second metastructure includes a second substrate and a second electrode. The method includes selectively applying an electric field between the first electrode and the second electrode, selectively applying an excitation light to the microfluidic channel at a first location corresponding to the array, and, by applying the electric field and the excitation light, trapping a nanoparticle at a second location corresponding to the trapping region.

In this manner, various aspects of the present disclosure provide for improvements in at least the technical fields of quantum photonics, as well as the related technical fields of energy production, biosensing, nano-assembly, label-free DNA sequencing, separation and analysis of extracellular vesicles or viral particles, quantum computing, material characterization, and the like.

This disclosure can be embodied in various forms, including through the use of hardware or circuits controlled by computer-implemented methods, computer program products, computer systems and networks, user interfaces, and application programming interfaces; as well as hardware-implemented methods, signal processing circuits, memory arrays, application specific integrated circuits, field programmable gate arrays, and the like. The foregoing summary is intended solely to give a general idea of various aspects of the present disclosure, and does not limit the scope of the disclosure in any way.

Other aspects of the invention will become apparent by consideration of the detailed description and accompanying drawings.

BRIEF DESCRIPTION OF THE DRAWINGS

FIG. 7 is a cross-sectional schematic view of a plasmonic nanostructure of FIGS. 1 through 3 demonstrating applicable forces during operation.

FIGS. 8A-8C is a plan view schematic diagraph of the particle translation relative to a nanostructure array of FIG. 4.

DETAILED DESCRIPTION

Figure 1:
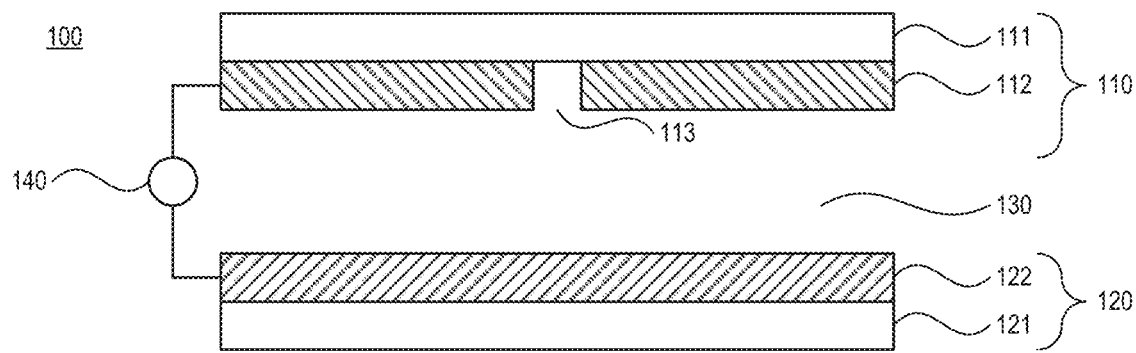
FIG. 1 is a cross-sectional view of a first example of a plasmonic nanostructure in accordance with one implementation.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Additionally, in the following description, numerous details are set forth, such as circuit configurations, waveform timings, circuit operations, and the like, in order to provide an understanding of one or more aspects of the present disclosure. It will be readily apparent to one skilled in the art that these specific details are merely exemplary and not intended to limit the scope of this application.

To resolve the aforementioned issues, the present disclosure describes a type of optically controlled nanotweezers referred to herein as an opto-thermo-electrohydrodynamic tweezer (OTET). An OTET in accordance with the present disclosure enables the trapping and dynamic manipulation of nanometer-scaled objects at locations that are several microns away from the high-intensity laser focus. At the trapping locations, the nanoscale objects experience both negligible photothermal heating and light intensity. An OTET as described herein employs a finite array of plasmonic nanostructures illuminated with light and applied alternating-current (AC) electric field to create a spatially-varying electrohydrodynamic potential capable of rapidly trapping sub-10 nm biomolecules at femtomolar concentrations on-demand. In comparison to the ETP approaches described above, an OTET exploits the interaction between ETP flow and AC electro-osmotic (EO) flow to establish an electrohydrodynamic potential capable of lower power trapping at tunable trapping locations that are a sufficient distance from the high-intensity laser focus to prevent photo-induced damage, as well as the sorting and/or subsequent manipulation of trapped particles.

The use of closely spaced arrays of plasmonic nanoantennas precludes achieving such on-demand fluid motion due to intrinsic thermoplasmonic convection. However, by employing photo-induced heating of a single plasmonic nanoantenna, on-demand fluid motion can be readily achieved, at least because intrinsic thermoplasmonic convection by a single plasmonic nanoantenna is weak (<10 nm/s). In accordance with the present disclosure, microm-eter-per-second nanoparticle transport velocity can be obtained by harnessing the photo-induced heating of a single plasmonic nanoantenna.

The OTET platform comprises a finite array of plasmonic nanostructures illuminated with light and a perpendicularly-applied AC electric field to optically induce thermal gradients and distort the AC electric field lines. The coupling of the nanostructure array with light results in highly localized and enhanced electromagnetic hotspots, which promotes light absorption. The enhanced light absorption results in a temperature rise and thermal gradient in the fluid. At a particular distance from an edge of the array, the forces due to the ETP flow and the forces due to the AC electro-osmotic flow cancel one another, resulting in a stable trapping position.

Figure 2:
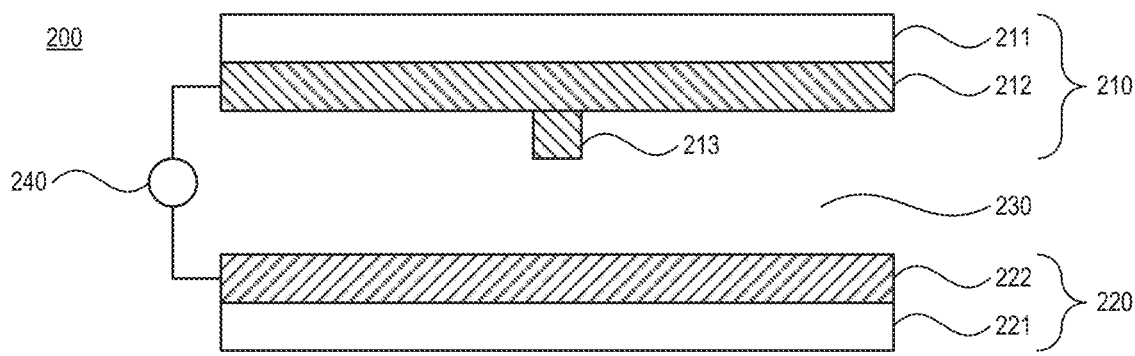
FIG. 2 is a cross-sectional view of a second example of a plasmonic nanostructure in accordance with another implementation.
Figure 3:
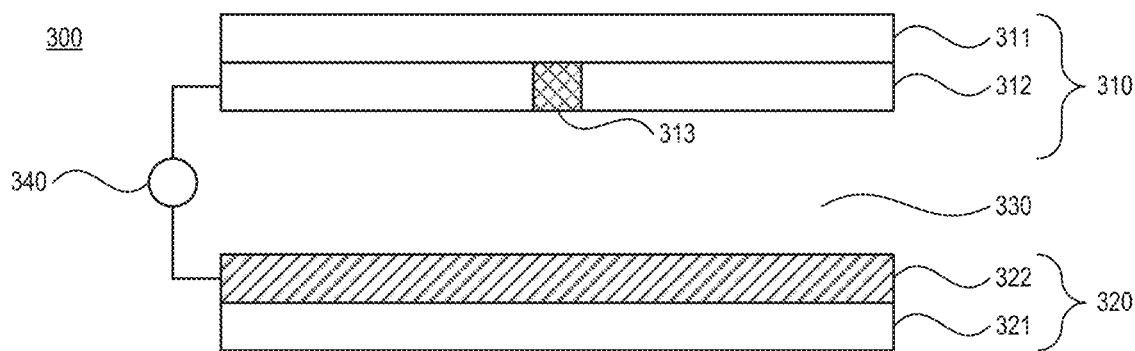
FIG. 3 is a cross-sectional view of a third example of a plasmonic nanostructure in accordance with yet another implementation.
Figure 4:
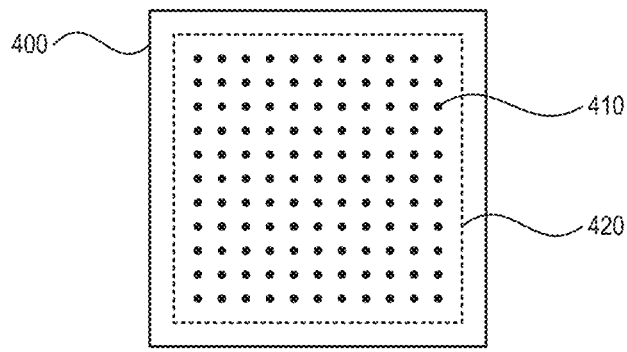
FIG. 4 is an overhead plan view of an exemplary nanostructure array for use with the nanostructures of FIGS. 1 through 3.
Figure 5:
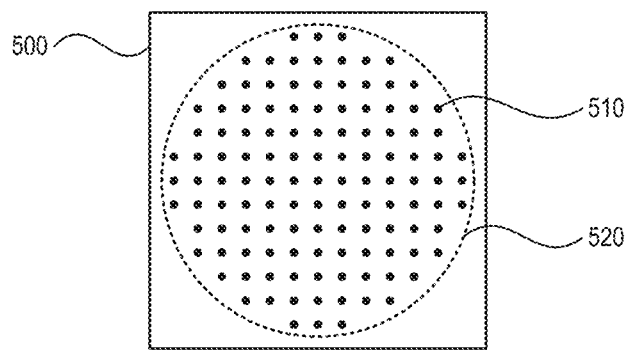
FIG. 5 is an overhead plan view of another exemplary nanostructure array for use with the nanostructures of FIGS. 1 through 3.
Figure 6:
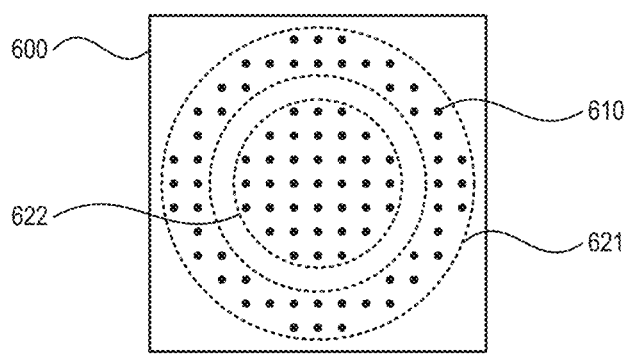
FIG. 6 is an overhead plan view of yet another exemplary nanostructure array for use with the nanostructures of FIGS. 1 through 3.

Exemplary plasmonic nanostructures are illustrated in FIGS. 1, 2, and 3 and exemplary arrays are illustrated in FIGS. 4, 5, and 6. In particular, FIGS. 1 through 3 each respectively illustrate partial cross-sectional views of a unit cell of the OTET. While FIGS. 1 through 3 each illustrate only a single unit cell and a single nanostructure, in practice the unit cell is repeated in a two-dimensional manner to form the array.

In the example of FIG. 1, an OTET 100 includes a first metastructure 110 which includes a first substrate 111, a first electrode 112, and a plasmonic nanohole 113; a second metastructure 120 which includes a second substrate 121 and a second electrode 122; a microfluidic channel 130 between the first metastructure 110 and the second metastructure 120; and a voltage source 140 which selectively applies an electric field between the first electrode 112 and the second electrode 122.

The second substrate 121 and the second electrode 122 are preferably formed of a material that is substantially transparent to light within a predetermined wavelength range. The predetermined wavelength range includes a wavelength of light from a laser light source used to illuminate the OTET 100 and, in some implementations at least a portion of a wavelength of light from a white light source which may be used to permit observation and/or imaging. In some examples, the first substrate 111 and the second substrate 121 are respectively formed of a glass. In some examples, the first electrode 112 is formed of a conductive material capable of absorbing light at the nanohole 113, which may be a metal such as gold or may be a semiconductor material such as silicon or geranium (including combinations and alloys). While FIG. 1 illustrates the second substrate 121 and the second electrode 122 as separate layers, in some examples the second substrate 121 and the second electrode may be integral. In some examples, the second substrate 121 and/or the second electrode 122 are formed of a substantially (e.g., >90%) transparent metal, such as indium tin oxide (ITO).

In the example of FIG. 2, an OTET 200 includes a first metastructure 210 which includes a first substrate 211, a first electrode 212, and a plasmonic nanopillar 213; a second metastructure 220 which includes a second substrate 221 and a second electrode 222; a microfluidic channel 230 between the first metastructure 210 and the second metastructure 220; and a voltage source 240 which selectively applies an electric field between the first electrode 212 and the second electrode 222.

The second substrate 221 and the second electrode 222 are formed of a material that is substantially transparent to light within a predetermined wavelength range. The predetermined wavelength range includes a wavelength of light from a laser light source used to illuminate the OTET 200 and, in some implementations at least a portion of a wavelength of light from a white light source which may be used to permit observation and/or imaging. In some examples, the first substrate 211 and the second substrate 221 are respectively formed of a glass. In some examples, the first electrode 212 and the plasmonic nanopillar 213 are formed of a conductive material capable of absorbing light at the nanopillar 213, which may be a metal such as gold or may be a semiconductor material such as silicon or geranium (including combinations and alloys). While FIG. 2 illustrates the second substrate 221 and the second electrode 222 as separate layers, in some examples the second substrate 221 and the second electrode may be integral. In some examples, the second substrate 221 and/or the second electrode 222 are formed of a substantially (e.g., >90%) transparent metal, such as indium tin oxide (ITO).

In the example of FIG. 3, an OTET 300 includes a first metastructure 310 which includes a first substrate 311 and a first electrode 312; a second metastructure 320 which includes a second substrate 321 and a second electrode 322; a microfluidic channel 330 between the first metastructure 310 and the second metastructure 320; and a voltage source 340 which selectively applies an electric field between the first electrode 312 and the second electrode 322. The first electrode 312 is formed of a photoconductive material. The photoconductive material, when illuminated at a particular portion, will generate excess carriers making an electrically conductive nanospot 313. The nanospots 313 may be formed in a particular pattern through the use of a spatial light modulator (SLM). In the presence of a lower frequency (<15 kHz or <20 kHz) AC electrical field and a central heating laser beam, the nanospots 313 will enable the assembly of particles at a position defined by the light pattern and AC electrical field. The assembly can be reconfigured by varying the shape of the light pattern array using the SLM.

The second substrate 321 and the second electrode 322 are formed of a material that is substantially transparent to light within a predetermined wavelength range. The predetermined wavelength range includes a wavelength of light from a laser light source used to illuminate the OTET 300 and, in some implementations at least a portion of a wavelength of light from a white light source which may be used to permit observation and/or imaging. In some examples, the first substrate 311 and the second substrate 321 are respectively formed of a glass. While FIG. 3 illustrates the second substrate 321 and the second electrode 322 as separate layers, in some examples the second substrate 321 and the second electrode may be integral. In some examples, the second substrate 321 and/or the second electrode 322 are formed of a substantially (e.g., >90%) transparent metal, such as indium tin oxide (ITO).

While each of FIGS. 1 through 3 illustrate an exemplary OTET of a bottom-exposure configuration, in which light (excitation light and/or imaging light, for example) enters the respective microfluidic channel from below, the present disclosure is not so limited. For example, an OTET in accordance with the present disclosure may have a top-exposure configuration, in which light enters the microfluidic channel from above. In this configuration, the respective first metastructure should be substantially (e.g., >90%) transparent to light within the predetermined wavelength range.

In the above configurations, the nanopillar 113, the nanohole 213, and the nanospot 313 are all examples of a plasmonic nanostructure in accordance with the present disclosure. Preferably, a plurality of plasmonic nanostructures are present and are disposed in an array of a particular shape. FIGS. 4 through 6 each illustrate a plan view of different exemplary OTETs having a plurality of plasmonic nanostructures disposed in an array, each of which may be examples of the OTETs 100, 200, and/or 300 illustrated in FIGS. 1 through 3.

In the example of FIG. 4, an OTET 400 includes a plurality of plasmonic nanostructures 410 disposed in a rectangular array 420. In FIG. 5, an OTET 500 includes a plurality of plasmonic nanostructures 510 disposed in a circular array 520. In FIG. 6, an OTET 600 includes a plurality of plasmonic nanostructures 610 disposed in a first annular array 621 and a second circular array 622, where the first annular array 621 and the second array 622 are concentric and nested. In other implementations, other array shapes may be implemented, such as elliptical, hexagonal, star-shaped, and so on. Moreover, where multiple arrays are implemented, they may be nested as illustrated in FIG. 6, may be disposed lateral to one another, or combinations thereof.

Varying the geometry of the patterned array molds the distribution of the assembled objects. For example, by using the OTET 500 illustrated in FIG. 5, the assembled objects may formed in a circular distribution at a critical distance around the circumference of the circular array 520. The trapping distance is dependent on the applied AC field frequency, as will be described in more detail below. The assembled nanoparticles can be patterned by applying an AC field frequency below a particular threshold. Through the use of the above arrays, it is possible to sort nanoparticles according to their size and/or shape.

As noted above, the OTETS described herein may trap and manipulate nanoscale objects based on the interaction between AC electro-osmotic flow forces and ETP flow. FIG. 7 illustrates this principle in greater detail. In particular, FIG. 7 illustrates a partial cross-section of an exemplary OTET 700, which may be the same as or similar to the OTETs illustrated in FIGS. 1 through 6 and described above.

The OTET 700 includes a first metastructure 710, a second metastructure 720, a microfluidic channel between the first metastructure 710 and second metastructure 720, and a voltage source 740 which selectively applies an electric field between the first metastructure 710 and the second metastructure 720. The first metastructure 710 includes a patterned portion 711, which corresponds to a plurality of nanostructures, and an edge portion 712 which does not include nanostructures. FIG. 7 also illustrates a nano-object 750 in the microfluidic channel 730. In operation, the voltage source 740 applies an AC electric field perpendicular to the first metastructure 710 and the second metastructure 720, across the microfluidic channel 730. The topography of the patterned portion 711 results in the distortion of the applied AC electric field to give rise to both normal and tangential AC electrical field components. The tangential AC electrical field component exerts Coulombic forces on the diffuse charges in the electrical double layer induced at the interface between the first and second metastructures 710, 720 and the microfluidic channel 730.

This AC-field-induced motion of the diffuse charges gives rise to an electro-osmotic motion of the fluid, and thus a force FEO on the nano-object 750 that is directed radially outward. An ETP flow is also induced by the action of both the laser-induced heating of the fluid near the patterned portion 711 and the applied AC electric field. The resulting fluid vortex provides a force FETP directed radially inward. These two opposing microfluidic flows create a stagnation zone where the fluid velocity goes to zero, which defines a position where the nano-object 750 is trapped. As illustrated in FIG. 7, the trapping position is located a distance dt from the outer edge of the patterned portion 711. Because the trapping position is displaced from the location of the laser beam, the nano-object 750 is trapped several microns away from the laser focus. While not illustrated in FIG. 7, the nano-object 750 also experiences a force in the out-of-plane direction as a result of the interaction between the surface charge on the nano-object 750 and its image charge in the conducting plane. This localizes the nano-object 750 in the out-of-plane direction.

If the laser illumination is displaced from the center of the patterned portion 711, the nano-object 750 can be translated along a path defined by the topography of the nanostructure array while still maintaining the "radial" position of the stagnation zone. This ability to structure the microfluidic flow field using a plasmonic nanostructure array provides for an approach to create on-demand flow fields to suppress the Brownian motion of particles and localize a single particle near a solid surface.

FIGS. 8A through 8C illustrate this particle translation. In particular, FIGS. 8A-8C illustrate a plan view of an OTET 800, which may be the same as or similar to the OTETs illustrated in FIGS. 1 through 7 and described above. The OTET 800 includes a nanostructure array 810. In FIG. 8A, a nanoparticle 830 is initially trapped due to the presence of laser light focused at an illumination spot 820. In FIG. 8B, the illumination spot 820 is moved in an upward direction, which results in a following motion of the nanoparticle 830 with some time lag. Afterward, in FIG. 8C, the nanoparticle 830 has been moved to a new location determined by the new position of the illumination spot 820. The illumination spot 820 may be moved by moving the light source itself, by rotating and/or translating a reflective element such as a mirror, by using a plurality of reflective elements such as an SLM, and the like.

The translation was demonstrated experimentally using an array of gold nanoholes with a diameter of 300 nm and a thickness of 120 nm on a glass substrate. Fabrication was performed using a template stripping approach. Experimental demonstration of trapping was performed using diluted solutions of bovine serum albumin (BSA) protein with a hydrodynamic radius of 3.4 nm, as well as with 20 nm and 100 nm polystyrene beads. The BSA protein was diluted to a concentration of 15 femtomoles (fM). A linearly polarized laser beam with a wavelength of 973 nm was focused to a spot size of 1.33 μm on the nanohole array using a water immersion objective lens with a numerical aperture of 1.2.

Figure 9:
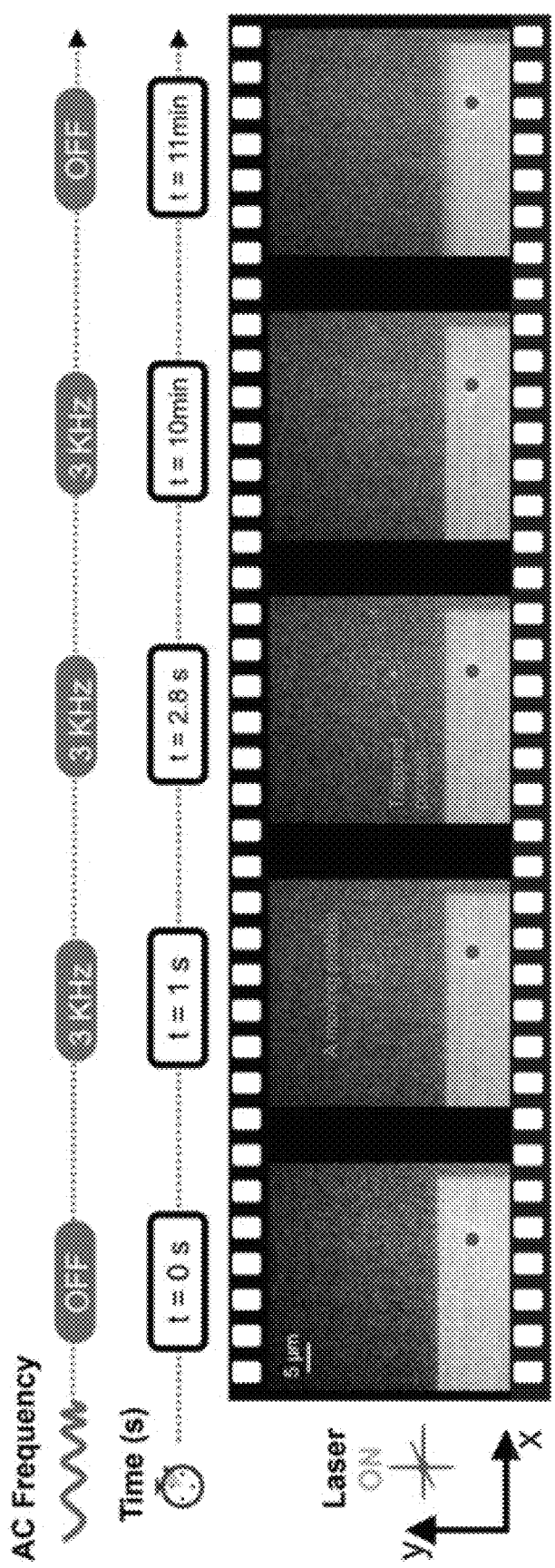
FIG. 9 is a sequence of elevation view images of an example of particle manipulation in accordance with various aspects of the present disclosure.

FIG. 9 illustrates, frame-by-frame, a sequence of fast transport, trapping, and release of a single PSA protein molecule. In the first frame, the nanohole array was illuminated with the laser light a position indicated by the dot. Initially, no macroscopic effect was observed. Subsequently, an AC electric field of 83333 volts per meter (V/m) at a frequency of 10 kHz kilohertz (kHz) was applied across the microfluidic channel, which resulted in the fast motion of the BSA protein by the radially inward ETP flow toward the nanohole array. No trapping occurred at this frequency. In the second and frames, the AC electric field frequency was reduced to 3 kHz and the opposing AC EO flow caused the BSA protein molecule to be localized at a distance of approximately 8.6 μm from the edge of the nanohole array within 3 seconds.

At this point, the trapped particle may be manipulated in one of at least the following ways: (1) the BSA protein may be held using both the laser and AC electric field (as in the fourth frame); (2) the BSA protein may be released by turning off the AC electric field (as in the fifth frame) or by increasing the frequency above a threshold value, such as 10 kHz; or (3) the BSA protein may be dynamically manipulated by moving the laser beam or translating the microscope stage as illustrated in FIGS. 8A-8C.

Figure 10A:
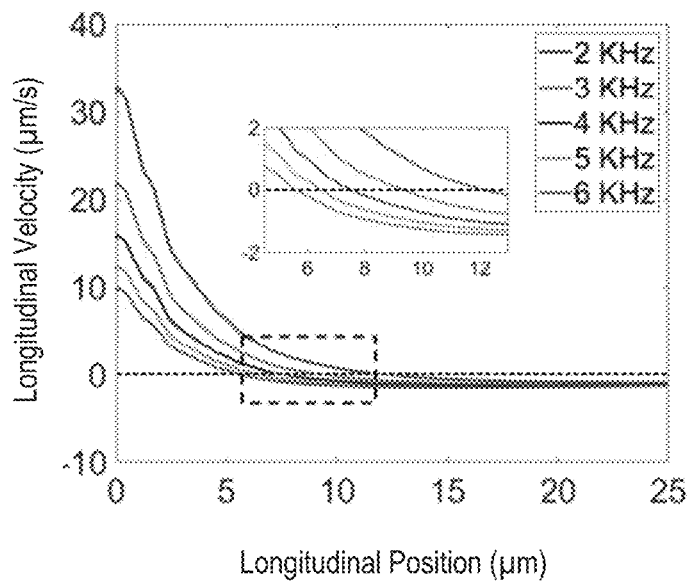
FIG. 10A is a graph illustrating an example of trapping behavior as longitudinal particle position relative to longitudinal velocity for each of a plurality of AC electrical field frequencies.
Figure 10B:
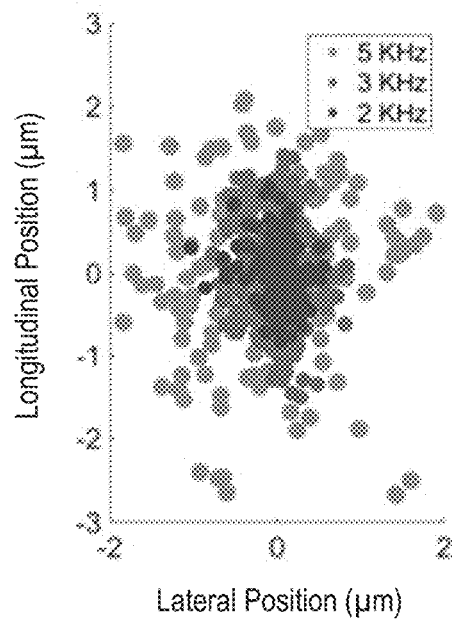
FIG. 10B is a graph illustrating an example of trapping behavior as the AC electrical field frequency corresponding to lateral and longitudinal particle positions.

The trapping distance dt between the position of the trapped object and the edge of the nanohole array can be tuned by changing the AC electric field frequency, as illustrated in FIGS. 10A-10B. At a lower AC electric field frequency, the radially-outward AC EO flow is increased relative to the ETP flow, which causes the shifting of the stagnation zone radially outward. As the frequency increases to 5 kHz, the trapping position of the BSA protein is shifted inward to a location that is closer to the nanostructure array.

FIG. 10A illustrates the results of a numerical simulation, and plots the longitudinal position (i.e., the distance from the edge of the nanostructure array) on the x-axis and the longitudinal velocity on the y-axis. The stagnation zone exists at the point where the longitudinal velocity is zero, which is shown in more detail in the inset. As can be seen from FIG. 10A, the location of the stagnation zone moves outward with decreasing AC electric field frequency. Thus, by tuning the frequency, the location of the trap relative to the edge of the nanostructure array may be controlled on-demand. The particle trapping stability of the OTET may also be controlled by tuning the AC electric field frequency, as illustrated in FIG. 10B which plots the lateral position on the x-axis and the longitudinal position on the y-axis. At lower frequencies, the particle surface interaction force is generally stronger, resulting in a tighter distribution of positions. This may be attributed to a phenomenon wherein, for lower frequencies, the electrical double layer surrounding the particle has more time to be sufficiently polarized by the AC electrical field.

Figure 11:
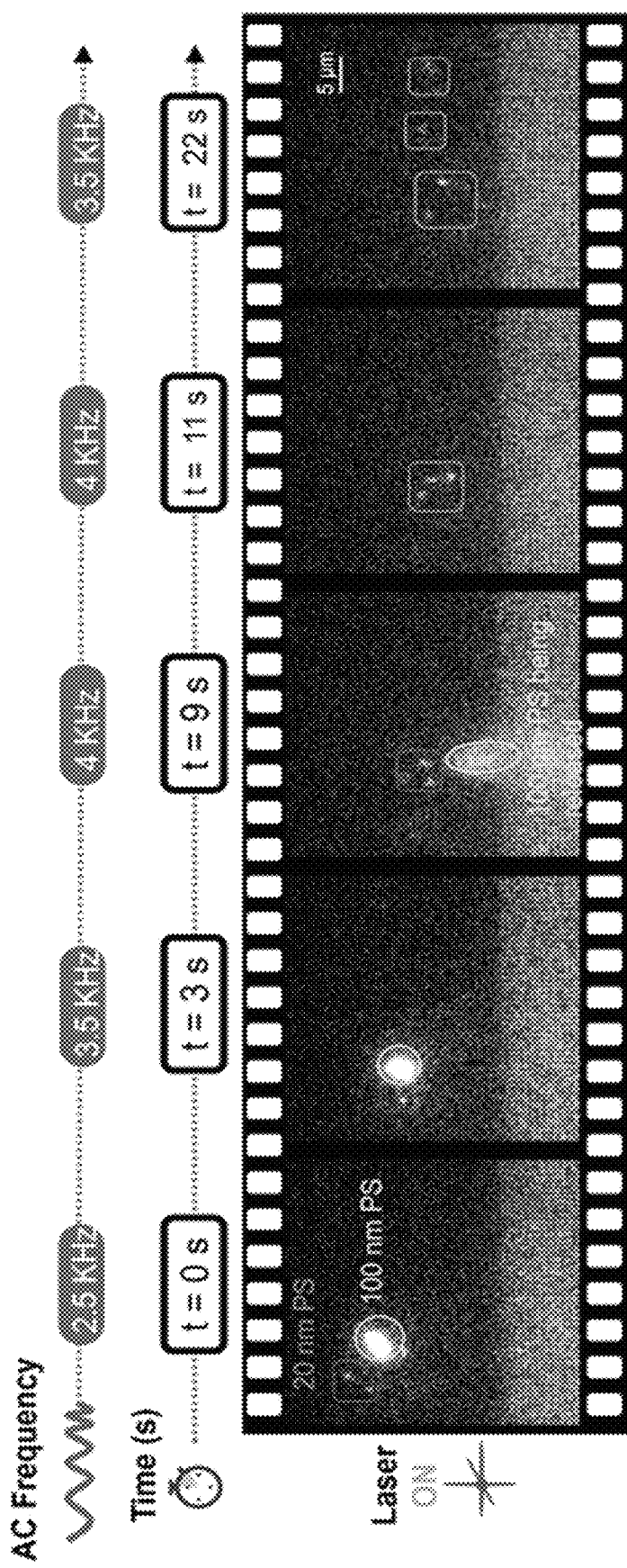
FIG. 11 is a sequence of elevation view images of an example of particles sorting using the systems of FIGS. 1 through 6.

The frequency dependence of the trapping stability may be used for size-based sorting by an OTET, as was demonstrated experimentally using the same OTET as described above with regard to FIG. 9. In particular, the OTET was used to perform the selective trapping of 20 nm polystyrene beads from a solution containing 100 nm and 20 nm beads. FIG. 11 illustrates, frame-by-frame, a sequence of size-based sorting of the beads. In the first frame, an AC electric field with a frequency of 2.5 kHz was used to trap both 20 nm beads (indicated by a box) and 100 nm beads (indicated by a circle). When the frequency was increased to 4 kHz as shown in the third frame, the 100 nm beads were released from the trap while the 20 nm beads remained in place. The frequency was subsequently decreased to 3.5 kHz to ensure that the 20 nm beads remained stably trapped.

Although the size-based sorting was demonstrating using polystyrene, this technique may be harnessed for the sorting of any desired particle, such as exosomes which range in size from 30 nm to 150 nm from a population of extracellular vesicles.

In demonstrating the particle trapping and manipulation behavior described above, including but not limited to the images shown in FIGS. 9 and 11, a test device and system was created and utilized. In particular, a 5 nm thick chromium (Cr) mask was deposited on a 1.5 mm×1.5 mm silicon (Si) wafer using a resistive evaporator. Subsequently, the substrate was spin-coated with 400 nm ZEP520A photoresist and baked at 180° C. for 2 min. Electron-beam lithography (EBL) was used to pattern the nanohole arrays having a radius of 150 nm and a lattice constant of 590 nm. The array was square in shape with a dimension of 70 μm. The patterned resist was developed in ZED-N50 for 2 min, rinsed with isopropyl alcohol (IPA), and blown dry in nitrogen. After 7 seconds of descumming, Cl2 plasma etching was applied for 75 seconds to transfer the pattern onto the Cr layer serving as the hard mask for a subsequent reactive ion etching (RIE) process. RIE proceeded for 2 min to open ~200 nm deep nanoholes into the Si wafer. To ensure the whole photoresist and Cr mask layers were stripped off before depositing a gold film, the patterned silicon wafer was sonicated in acetone for 10 min, then soaked in Cr etchant for 10 min. As a result, the patterned Si wafer was formed into a template.

Subsequently, 120 nm gold film was deposited on the template. The resistive evaporator was again utilized to deposit the 120 nm gold film onto the template. UV-curable epoxy was then applied onto the gold film, which was then covered with an ITO-coated glass substrate. The assembly was then exposed under UV light at a wavelength of 324 nm for 12 min to harden the epoxy. The gold film was peeled off the Si template, after which the gold film was packaged into a microfluidic channel. The used Si template was cleaned using O2 plasma etching and gold etchant. The Si template was then reused by depositing another 120 nm gold film and performing the template stripping process again.

To package the gold nanohole array sample into a microfluidic chip, the surface of the gold film was treated using a polymer solution for 10 min to ensure that the surface acquires a net surface charge to prevent particles from sticking to the surface. The polymer solution consists of poly (sodium 4-styrenesulfonate) potassium chloride (1:5) solution in water (1:25). The sample was then flushed under deionized water thoroughly and blown dry under N2. Finally, the gold film was sandwiched by covering it with another ITO coated glass coverslip spaced by a 120 μm thick dielectric spacer to create a microfluidic channel around the patterns.

Depending on the test, BSA or polystyrene beads were all originally of a concentration of 1 mg/mL. BSA was diluted by 1 billion times using deionized water to generate a sufficiently-sparse solution suitable for single molecule manipulation. The final concentration of the BSA molecule was 15 fM. The 20 nm polystyrene solution was diluted by 10 million times, whereas the 100 nm polystyrene solution was diluted by 1 million times.

Trapping and imaging was performed using a custom fluorescent imaging and optical trapping microscope based on a Nikon Ti2-E™ inverted microscope. A high quantum-efficiency sCMOS camera, a Photometrics PRIME 95B™, was used to acquire images at a frame rate of 2.5 frames per second (fps). The trapped fluorescent polystyrene beads were excited under green light from a filtered broadband fluorescent illumination lamp, Nikon INTENSILIGHT C-HGFI™. The emitted red light was collected through the same objective lens and imaged on the camera. The nanohole array was excited by a 973 nm semiconductor diode laser, Thorlabs CLD1015™. The laser beam was focused with a Nikon™ 60× water-immersion objective lens having a numerical aperture of 1.2. The AC electric field was supplied by a dual-channel function generator, BK Precision 4047B™. Electrical conductivity and electrophoretic mobility were measured using Anton Paar Litesizer 500™. The electrical conductivity of the BSA protein sample was 3.3 mS/m, while its electrophoretic mobility was −3 (μm·cm)/(V·s).

The electromagnetic simulation (see, e.g., FIGS. 10A-10B) was performed using a full-wave simulation formalism in Lumerical (TD) finite difference time domain (FDTD) software. Periodic boundary conditions with a 590 nm lattice constant was applied to mimic an infinite array of nanoholes. Perfectly matched layers were placed at the top and bottom of the domain to prevent backscatter from boundaries. A linearly-polarized plane wave served as the light source. Absorption was calculated as (1−R−T), where R refers to the reflectance and T refers to the transmittance. A 3D COMSOL model was established to solve the heat transfer and fluid dynamics problem. A prescribed temperature of 293.15 K was set at the boundaries for solving heat transfer. The AC electro-osmotic flow was modeled using a slip boundary condition on the surface of the nanohole array. The slip velocity was the electro-osmotic slip velocity vector u, given by the expression $u=\mu_{eo}E_t$, where $\mu_{eo}=-(\epsilon_r \epsilon_0 \cdot \zeta)(\mu)$ is the electro-osmotic mobility, $\epsilon_r$ is the relative permittivity, $\epsilon_0$ is the permittivity of free space, $\zeta$ is the zeta potential, and $\mu$ is the dynamic viscosity of the liquid. $E_t = E-(E \cdot n)n$ and E is calculated by solving the Poisson equation. The zeta potential used was calculated from the measured values. The no-slip boundary condition $u=0$ was set on all other boundaries. The thermal properties of glass, gold, and water were adapted from the COMSOL material library. The measured electrical conductivity of liquid was used. The relative permittivity of water was set as 78.

The above-described techniques provide a method to trap and dynamically manipulate nanoscale (e.g., sub-10 nm) particles and biomolecules at femtomolar concentrations within a few seconds at a trapping position several microns away from the high-intensity laser focus by using a plasmonic nanostructure array. The above-described techniques may also achieve size-based sorting of sub-100 nm objects. Thus, an OTET in accordance with the present disclosure may be used as a tool for the biological sensing of analytes at low levels.

Various aspects of the present disclosure may be practically implemented in several fields. For example, the present disclosure may be applied for ultra-low detection limit biological sensing, single molecule analysis to determine the diffusion coefficient and electrokinetic mobility of proteins in solution, size-based sorting of nanoscale objects such as exosomes, and so on.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A nanotweezer, comprising:
    a first metastructure including a first substrate, a first electrode, a plurality of plasmonic nanostructures arranged in an array, and a trapping region laterally displaced from the array;
    a second metastructure including a second substrate and a second electrode;
    a microfluidic channel between the first metastructure and the second metastructure;
    a voltage source configured to selectively apply an electric field between the first electrode and the second electrode; and
    a light source configured to selectively apply an excitation light to the microfluidic channel at a first location corresponding to the array, thereby to trap a nanoparticle at a second location corresponding to the trapping region,
    wherein the plurality of plasmonic nanostructures are arranged in a plurality of rows and a plurality of columns within the array,
    wherein each of the rows within the array are substantially orthogonal to each of the columns within the array, and
    wherein a first pitch between each plasmonic nanostructure and an adjacent plasmonic nanostructure within each row of the plurality of rows is substantially the same.

2. The nanotweezer according to claim 1, wherein a frequency of the electric field is less than 10 kHz.

3. The nanotweezer according to claim 1, wherein the first electrode includes gold, and respective ones of the plurality of plasmonic nanostructure are nanoholes disposed in the first electrode.

4. The nanotweezer according to claim 1, wherein the second electrode is formed of ITO.

5. The nanotweezer according to claim 1, wherein the light source is a laser light source.

6. The nanotweezer according to claim 1, wherein the nanoparticle is a biomolecule.

7. The nanotweezer according to claim 6, wherein the biomolecule has a size of less than or equal to 10 nm.

8. The nanotweezer according to claim 1, wherein a second pitch between each plasmonic nanostructure and an adjacent plasmonic nanostructure within each column of the plurality of columns is substantially the same.

9. The nanotweezer according to claim 8, wherein the first pitch is substantially equal to the second pitch.

10. The nanotweezer according to claim 9, wherein the plurality of plasmonic nanostructures includes a plurality of nanoholes formed in the first electrode.

11. The nanotweezer according to claim 9, wherein the plurality of plasmonic nanostructures includes a plurality of plasmonic nanopillars protruding from a surface of the first electrode, wherein the surface faces the microfluidic channel.

12. The nanotweezer according to claim 1, wherein the array is a uniform planar array.

13. The nanotweezer according to claim 12, wherein the uniform planar array includes a rectangular array.

14. The nanotweezer according to claim 12, wherein the uniform planar array includes a circular array.

15. The nanotweezer according to claim 12, wherein the uniform planar array includes a first array nestled within a second array.

16. The nanotweezer according to claim 15, wherein:
    the first array is a first circular array,
    the second array is a second circular array, and
    a diameter of the first array is less than a diameter of the second array.

* * * * *